United States Patent [19]

Pentith

[11] 3,986,600
[45] Oct. 19, 1976

[54] ARMOURED FLEXIBLE CONVEYOR HAVING LIMITED SEPARATION PANS

[75] Inventor: Gerald Richard Oldham Pentith, Barnsley, England

[73] Assignee: Pitcraft Limited, Sheffield, England

[22] Filed: Dec. 31, 1974

[21] Appl. No.: 537,695

[52] U.S. Cl. ............................... 198/735; 198/861
[51] Int. Cl.² ........................................ B65G 41/00
[58] Field of Search ........... 198/204, 168, 195, 196, 198/109, 171; 37/190, 192 R

[56] References Cited
UNITED STATES PATENTS

| | | | |
|---|---|---|---|
| 3,458,235 | 7/1969 | Romer et al. | 198/204 |
| 3,625,567 | 12/1971 | Blumenthal | 198/204 |
| 3,796,296 | 3/1974 | Bakker | 198/109 |

FOREIGN PATENTS OR APPLICATIONS

| | | | |
|---|---|---|---|
| 1,142,466 | 2/1969 | United Kingdom | 198/204 |
| 1,104,150 | 2/1968 | United Kingdom | 198/204 |

*Primary Examiner*—L. J. Paperner
*Assistant Examiner*—James M. Slattery
*Attorney, Agent, or Firm*—Lowe, King, Price & Markva

[57] ABSTRACT

An armoured flexible conveyor comprising pans connected together so that separation of the pans is prevented except when snaking-over to a new alignment adjacent a newly-cut mine face and except when the conveyor extends over humps and swillies in the mine floor, and a rigid plate secured along one side of each pan, said plate extending upwardly from said pan, adjacent pairs of pan ends being connected to each other, firstly by upper and lower joints between adjacent ends of said rigid plates, one of said joints being a universal joint and the other being a loose joint affording limited separation of said plates and pans at that joint, and secondly, by a loose joint at the other side of said pans also affording limited separation of said pans at said other side.

3 Claims, 6 Drawing Figures

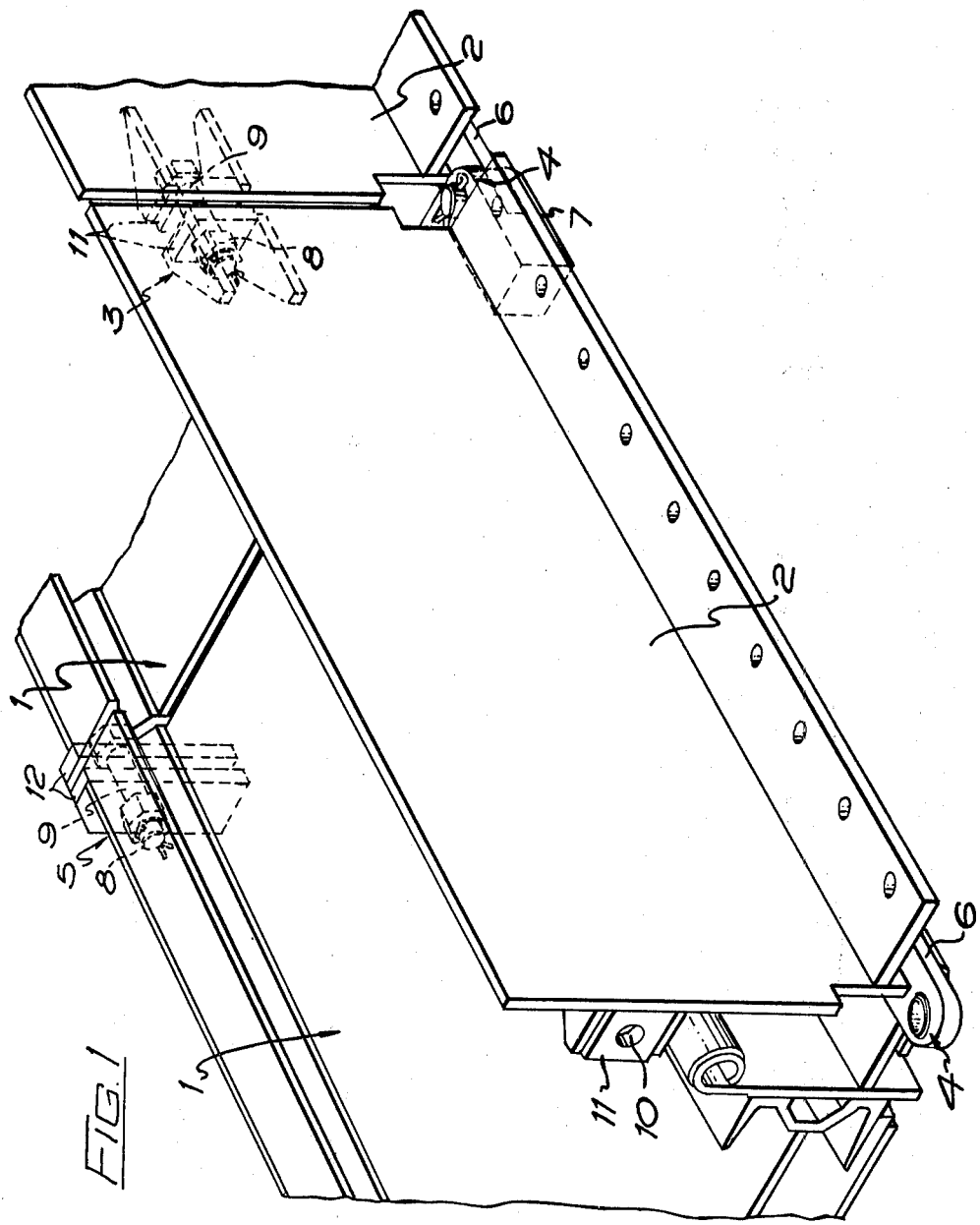

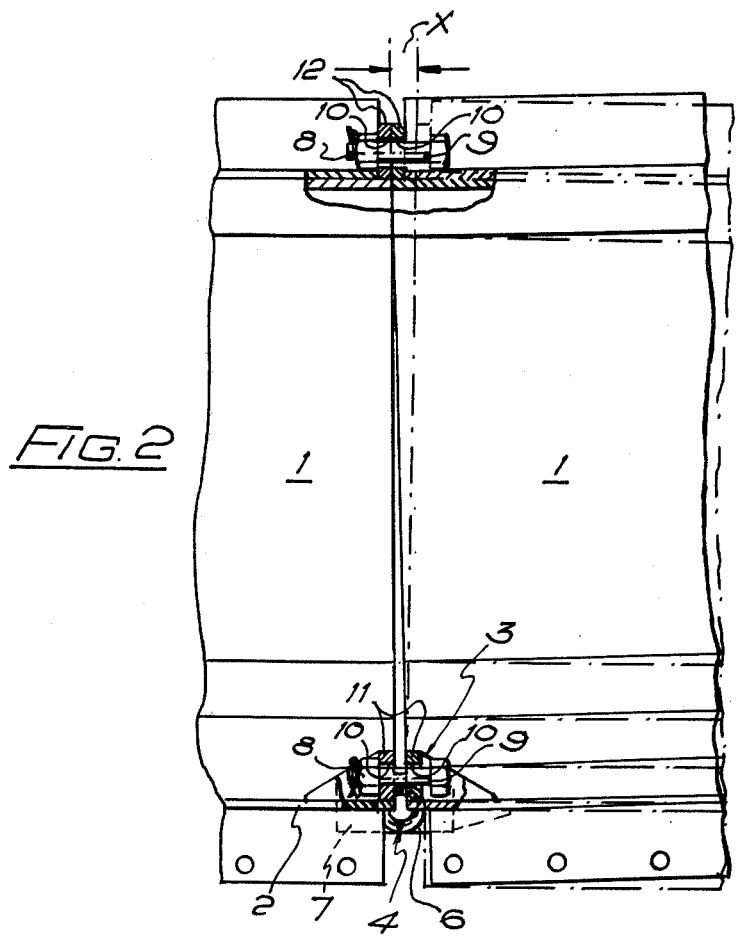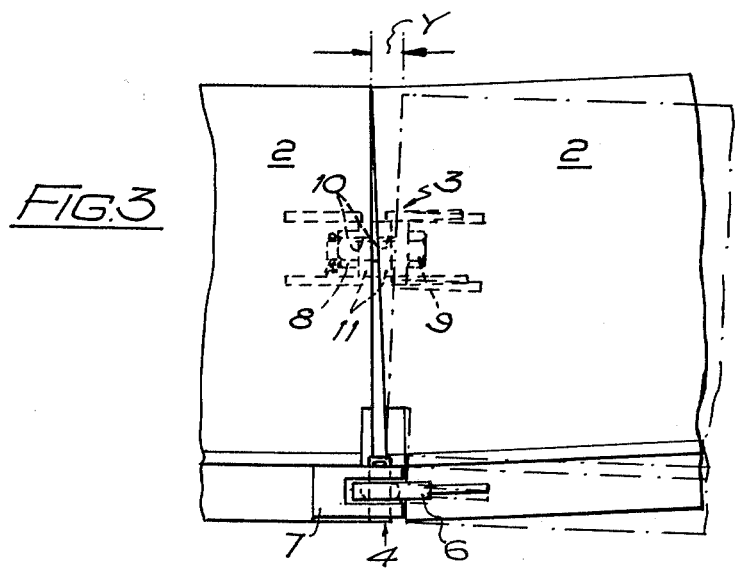

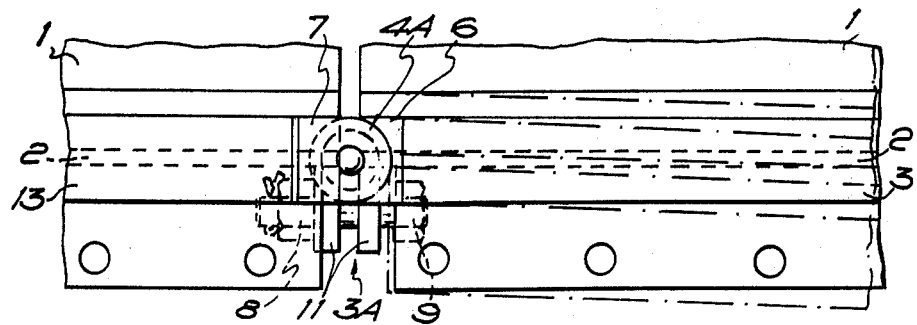
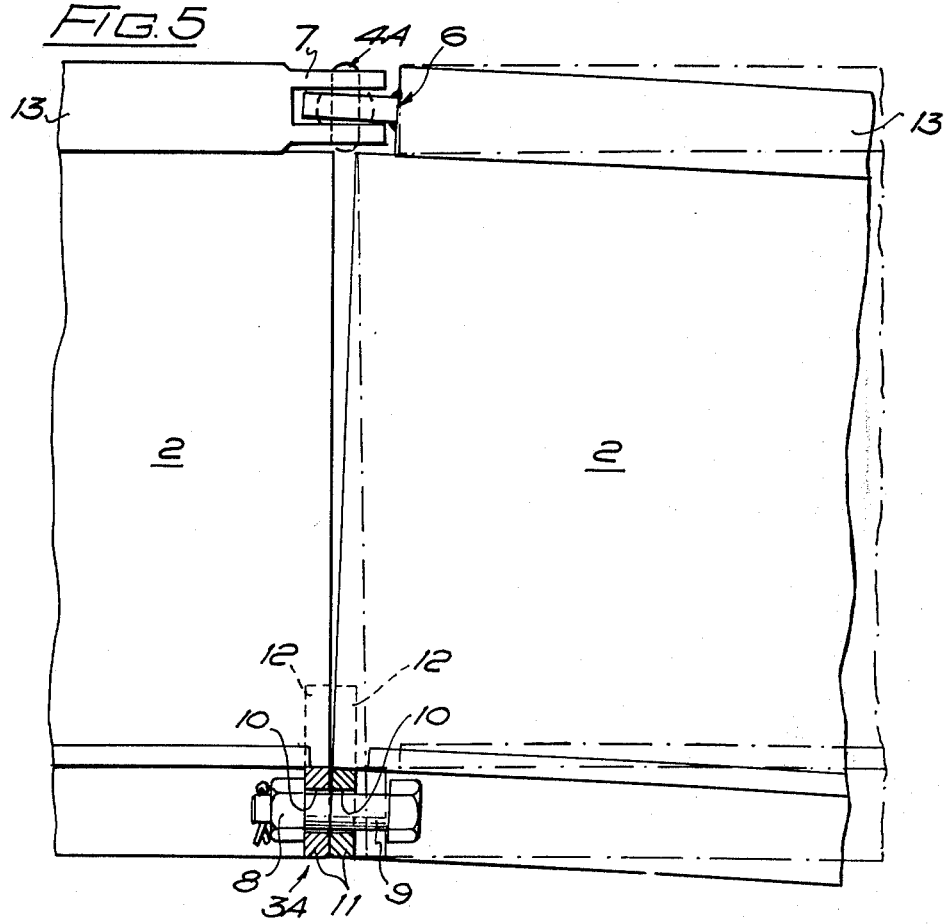

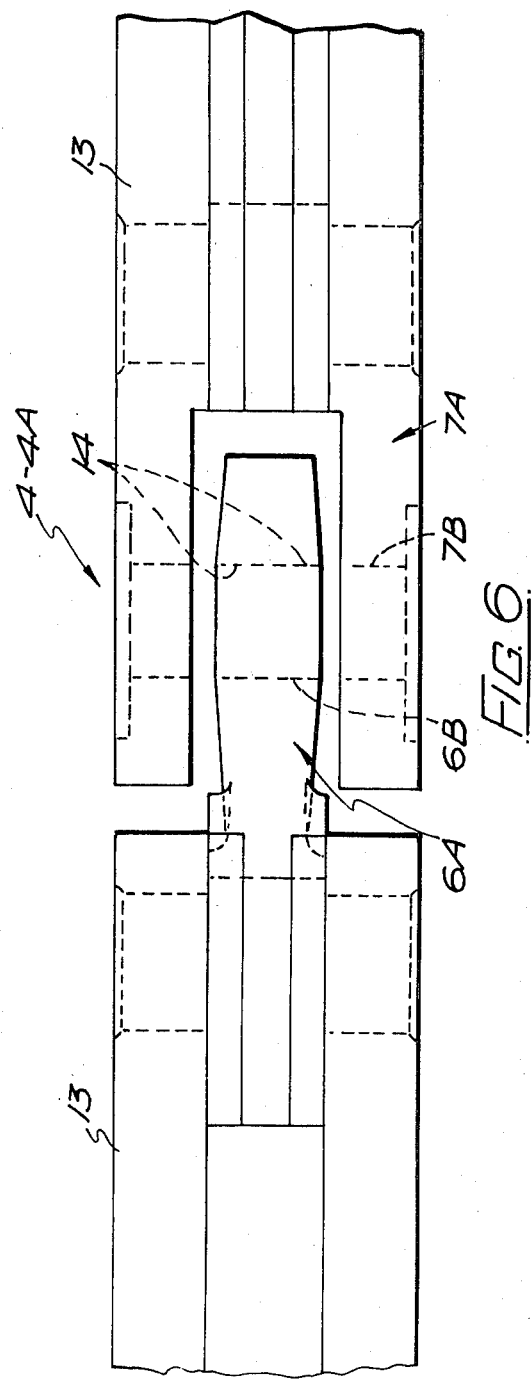

ARMOURED FLEXIBLE CONVEYOR HAVING LIMITED SEPARATION PANS

This invention relates to conveyors, more particularly armoured flexible conveyors of the type in which each pan of the conveyor is provided with a rigid longitudinal guide rod for guiding and/or carrying a mining machine along a cutting face alongside which the conveyor extends.

It is known to move the machine by effecting a drive off the conveyor, means being provided for gripping the guide rods of the pans of the conveyor. It is also proposed to form the guide rods so as to be positively engageable by or to engage positively with an endless chain carried by the machine and driven by a winch in the machine, as described in U.S. Pat. No. 3,753,596.

In either case, if the machine is to cut in both directions, the pans of the conveyor should be connected together in a manner minimizing the extent to which the pans can separate to no more than is absolutely necessary for snaking over to a new alignment adjacent a newly-cut face, so that the linear length of the conveyor can be fixed even though flexibility is afforded for snaking-over, and upon starting or reversal of the machine drive the pull on the conveyor is substantially immediately distributed along the entire length of conveyor, so than no one pan is required to sustain all the load.

The object of the invention is to provide a connection between the pans of an armoured flexible conveyor whereby separation of the pans is prevented except for articulation when snaking-over to a new alignment adjacent a newly-cut face and when the conveyor extends humps and swillies, the articulation being limited so that overlap between the ends of the pans is unnecessary for smooth running of the scraper chain and flights.

According to the present invention an armoured flexible conveyor comprising pans connected together so that separation of the pans is prevented except when snaking-over to a new alignment adjacent a newly-cut face and except when the conveyor extends over humps and swillies, has each pan provided with a rigid plate secured along one side of the pan and extending upwardly from the pan, adjacent pairs of ends of the pans being connected to each other, firstly by upper and lower joints between the adjacent ends of the rigid plates, one of these joints being a universal joint and the other being a loose joint affording limited separation of the plates and pans at that joint, and secondly by a loose joint at the other side of the pans also affording limited separation of the pans at that third joint.

The loose joints permit the pans to articulate horizontally and vertically by pivoting at the universal joints, and at the same time the loose joints limit the separation so that the articulated joint cannot be damaged by such relative movement and also ensure close enough alignment between the ends of the pans for smooth running of the scraper chain and flights without any overlap between the ends of the pans.

The universal joints are preferably ball joints and they preferably occupy the same relative positions, i.e., all being the upper joints or all being the lower joints between the plates, so that the overall length of the conveyor is fixed along the line of the ball joints, as is especially advantageous when the ball joints are the upper joints and connect rigid longitudinal guide rods secured to the plates and positively engageable by or engaging positively with an endless chain or other drive carried by a mining machine and driven by a winch in the machine, e.g., as described in U.S. Pat. No. 3,753,596, so that upon starting or reversal of the machine drive the pull on the conveyor is substantially immediately distributed along the entire length of conveyor. Alternatively, the universal joints could be constituted by pins fitting into holes with flared mouths so that, whilst in the holes, the pins can be displaced, within the limited imposed by the flaring.

The loose joints preferably consists of nuts and bolts loosely fitting holes in brackets secured to the plates and pans, the extent of separation at the loose joints being dependent on the lengths of the bolts in relation to the thickness of the brackets, and closing movement being limited by abutment of the adjacent ends of the pans near to the loose joints.

Two embodiments of the invention will now be described, by way of example only, with reference to the accompanying drawings, in which:

FIG. 1 is a fragmentary perspective view of an armoured flexible conveyor according to the invention;

FIG. 2 is a fragmentary plan view (partly in section) corresponding to the right-hand end of FIG. 1;

FIG. 3 is an elevation of FIG. 2 taken from below;

FIGS. 4 and 5 correspond respectively to the lower part of FIG. 2 and to FIG. 3, but show part of another armoured flexible conveyor according to the invention; and FIG. 6 is a side elevation of an alternative universal joint to that shown in FIGS. 1 to 5.

In FIGS. 1 to 3, an armoured flexible conveyor comprises pans 1 each of which is provided with a rigid plate 2 secured along one side of the pan and extending upwardly from the pan, the adjacent ends of the pans being connected to each other by upper and lower joints 3, 4 respectively between the adjacent ends of the rigid plates 2, and a third joint 5 at the other side of the pans 1. The lower joint 4 between the plates 2 is a ball joint between a tongue 6 and a forked member 7 secured one to each pan 1, while the upper joint 3 between the plates and the third joint 5 at the other side of the pans are loose joints consisting of nuts 8 and bolts 9 loosely fitting holes 10 in brackets 11, 12 secured to the plates 2 and pans 1.

The loose joints 3, 5 permit the pans 1 to articulate horizontally and vertically by pivoting at the ball joint 4, and at the same time the loose joints limit the separation (which is indicated as "X" for the maximum horizontal separation in FIG. 2 and "Y" for the maximum vertical separation in FIG. 3) so that the ball joint cannot be damaged by such relative movement, and the loose joints also ensure close enough alignment between the ends of the pans for smooth running of the scraper chain and flights (not shown) without any overlap between the ends of the pans 1.

As FIG. 1 indicates, the ball joints 4 occupy the same relative positions, i.e. all being the lower joints between the plates, so that the overall length of the conveyor is fixed along the line of the ball joints. This is especially advantageous when, as shown in the modification in FIGS. 4 and 5 the ball joints 4A are the upper joints and connect rigid longitudinal guide rods 13 secured to the plates 2 and engageable by a drive carried by a mining machine (not shown) and driven by a winch in the machine. Plain square-section rods, such as those shown in FIGS. 4 and 5, could be engaged by an endless chain drive such as described in British Pat. No. 1,343,952. For engagement with an endless chain drive such as is described in U.S. Pat. No. 3,753,596 the guide rods 13 could be provided with holes for pegs for pushing into the chain, and the holes may extend horizontally or vertically, as described in British Pat. No. 1,367,055 (which describes a convenient manner of manufacturing such guide rods), depending on whether the winch-driven chain of the machine is in a horizontal plane or a vertical plane. The lower joint 3A and the third joint 5 consist of nuts 8 and bolts 9, which (as before) fit loosely in holes 10 in brackets 11, 12 secured to the plates 2 and pans 1.

In FIG. 6 is shown an alternative articulated joint to the ball joints 4 and 4A of FIGS. 1 to 3 and 4, 5 respectively. A tongue 6A fits into a forked member 7A, both of which are provided with co-axial holes 6B, 7B respectively to receive a connecting pin (not shown). The hole 6B has flared mouths 14 so that the connection pin may rock in the hole 6B within the limits imposed by the flared mouths 14. Preferably, the hole 6B is concave in shape, with the minimum diameter corresponding to the diameter of the connecting pin.

What I claim is:

1. An armoured flexible conveyor comprising pans connected together so that separation of the pans is permitted only when snaking-over to a new alignment adjacent a newly-cut mine face and when the conveyor extends over humps and swillies in a mine floor, wherein a rigid plate is secured along one side of each pan, said plate extending upwardly from said pan, adjacent pairs of pan ends being connected to each other, firstly by upper and lower joints between adjacent ends of said rigid plates, one of said joints being a ball joint and the other being a loose joint affording limited separation of said plates and pans at that joint, and secondly, by a loose joint at the other side of said pans also affording limited separation of said pans at said other side, wherein the ball joints are all upper joints, and longitudinal guide rods are secured to said plates and are connected by said ball joints.

2. A conveyor as claimed in claim 1, wherein said loose joints comprise nuts and bolts loosely fitting holes in brackets secured to said plates and pans.

3. An armoured flexible conveyor comprising pans connected together so that separation of the pans is permitted only when snaking-over to a new alignment adjacent a newly-cut mine face and when the conveyor extends over humps and swillies in a mine floor, wherein a rigid plate is secured along one side of each pan, said plate extending upwardly from said pan, adjacent pairs of pan ends being connected to each other, firstly by upper and lower joints between adjacent ends of said rigid plates, one of said joints being a ball joint and the other being a loose joint affording limited separation of said plates and pans at that joint, and secondly, by a loose joint at the other side of said pans also affording limited separation of said pans at said other side, wherein said ball joint comprises a tongue, a forked member receiving said tongue, both tongue and forked member being provided with coaxial holes, a connecting pin passing through said holes, said hole of said tongue having flared mouths.

* * * * *